Feb. 20, 1940.　　　　D. COLLINS　　　　2,191,125
AUXILIARY STEERING MECHANISM
Filed Oct. 20, 1937　　　3 Sheets-Sheet 1
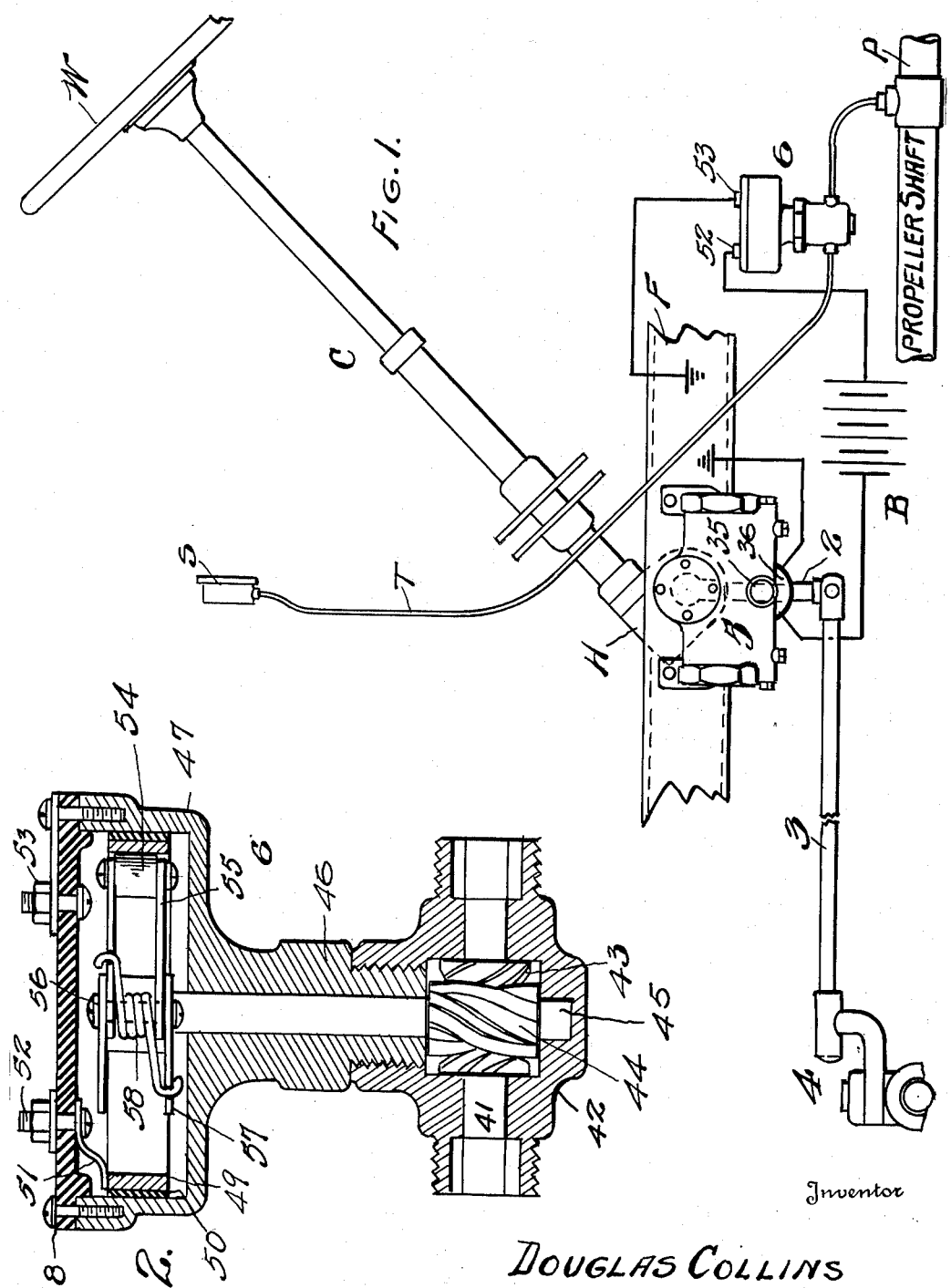
Inventor
DOUGLAS COLLINS
By Chas K. Davies & Son
Attorney Feb. 20, 1940. D. COLLINS 2,191,125
AUXILIARY STEERING MECHANISM
Filed Oct. 20, 1937 3 Sheets-Sheet 3
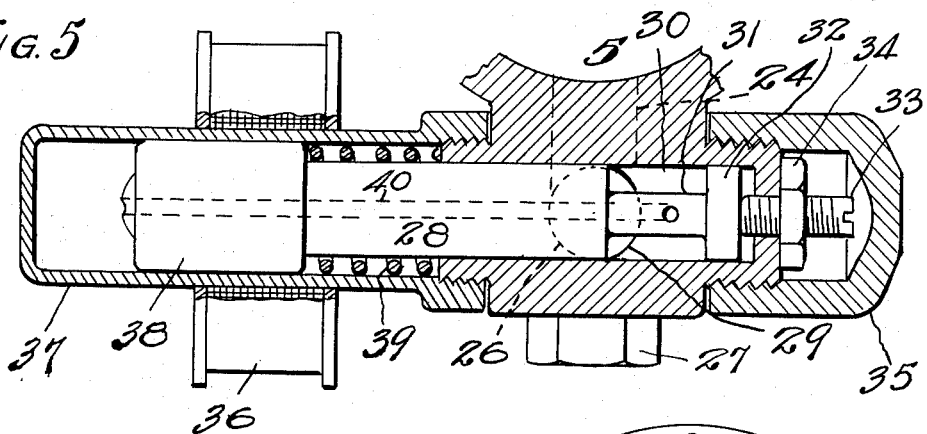
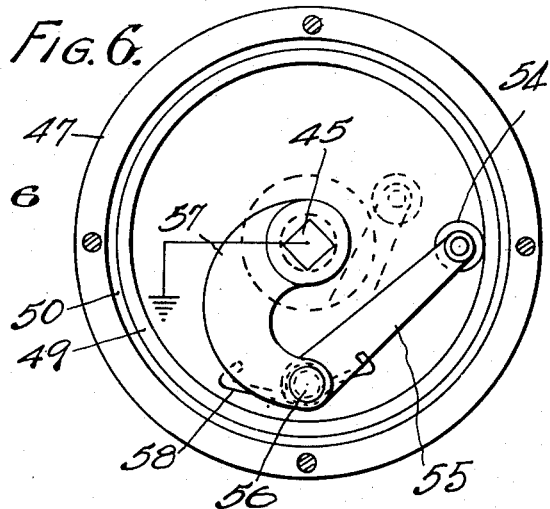
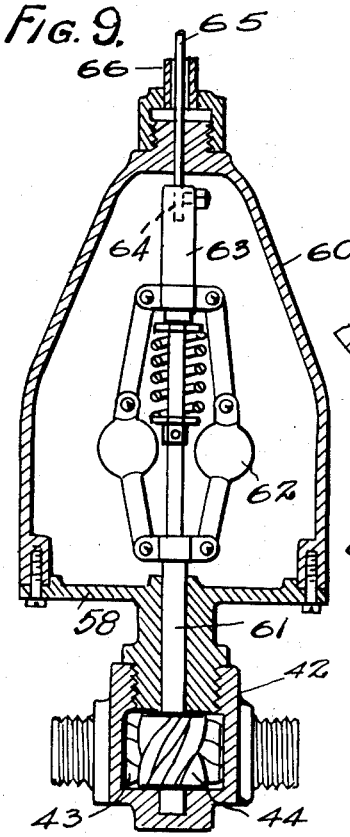
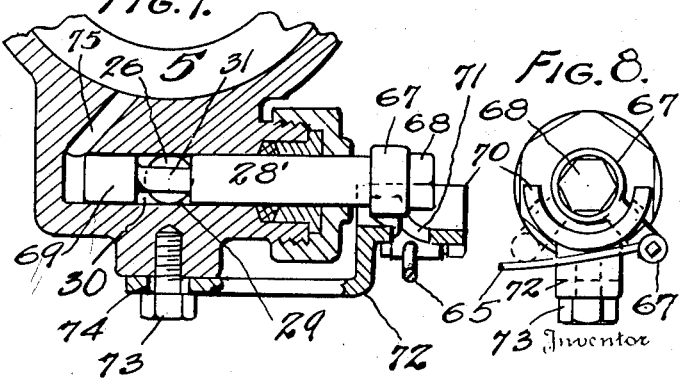
Douglas Collins
By Chas. K. Davies & Son.
Attorney Patented Feb. 20, 1940

2,191,125

UNITED STATES PATENT OFFICE 2,191,125

AUXILIARY STEERING MECHANISM

Douglas Collins, Salisbury, N. C.

Application October 20, 1937, Serial No. 170,113

8 Claims. (Cl. 180—79)

My present invention relates to an improved auxiliary steering mechanism which, while adapted for use in an aircraft as well as a watercraft, is especially designed for use with automobiles, buses, trucks, and other automotive vehicles. In the accompanying drawings I have exemplified a physical embodiment of my invention when installed as an accessory or auxiliary for the conventional steering mechanism of a typical passenger car or automobile.

The invention consists essentially in the combination with a steering mechanism, of an auxiliary control therefor governed by a predetermined rate of speed of the vehicle or car, or the R. P. M. of the propeller shaft of the car, for automatically imposing a yielding load-resistance against an operating part of the steering mechanism for the purpose of preventing "over-control" by manual operation of the steering mechanism.

At normal low-speeds of the car the auxiliary control mechanism remains dormant or inactive; at predetermined high-speeds of the car the auxiliary control mechanism is automatically brought into action; and at all speeds of the car the steering mechanism is available for use in usual manner for the customary performance of its functions.

When the car is traveling at high speed, the auxiliary control mechanism provides a safeguard for the driver of the car. In an emergency, as for instance, when being forced to the right off the highway onto a soft or irregular shoulder, many drivers tend to jerk the steering wheel over to the left in their efforts to regain the proper lane. Such "over-control" in steering usually swerves or swings the car too far toward the left side of the highway, which excessive movement again places the car in a dangerous position. Under such conditions the auxiliary mechanism of my invention automatically operates, to prevent "over-control" or excessive speed in the rate of the turning movement of the steering wheel. The auxiliary mechanism eliminates the danger of unexpected emergencies, such as those attending the blowing-out of a tire while the car is traveling at high speed, by automatically applying a load-resistance against the manually controlled flexible condition of the steering mechanism. The mechanism of my invention is also effective in counteracting the effects of sliding contact of the front wheels of a car with a curb; with other obstructions or hazards such as ruts, and sand in the roadway, that would tend to swerve the car from its course; and it compensates for adverse wind-pressure against the car. These and other hazards in traffic are guarded against by my auxiliary steering control to insure safety, and to facilitate the usual manual steering control without in any manner impairing its proper functions.

I automatically change the usual steering mechanism from an easily flexible control, to a less easy flexibility of control, by imposing a yielding load resistance which becomes operative, only, if and when any excessive rate of movement of the steering mechanism is attempted while the vehicle is traveling at an excessive speed or predetermined high-speed. This yielding load resistance is imposed against an operating part of the steering mechanism, as for instance, the steering-arm or sector-arm of the steering mechanism. This load resistance is rendered active and made effective to dampen the movement of the steering-arm or sector-arm at high speeds of the car, by means under control of the car-speed, preferably through operative connections and control devices operative from the propeller shaft of the car.

In the exemplified form of the invention illustrated in the drawings I utilize a combination involving a hydraulic-controller and a valve-device therefor, valve-operating means, a governor for the valve-operating means, and the usual speedometer-shaft and propeller shaft of the car.

While I have disclosed one complete example of the physical embodiment of my invention, it will be understood that changes and alterations may be made in this exemplification, within the scope of my appended claims, without departing from the principles of my invention.

Figure 1 is an assembly view, as in side elevation, showing necessary parts of a conventional steering mechanism, and the automatic control mechanism of my invention combined therewith.

Figure 2 is a vertical sectional view of a combined circuit maker and governor for the valve-operating means of the controller, the circuit maker being shown in closed position.

Figure 5 is an enlarged detail sectional view of the valve-device and its electro-magnetic operating means, the valve being partially closed to cause a load-resistance against movement of the steering-arm.

Figure 6 is a top plan view of the circuit maker with its cover removed.

Figure 7 is a modified construction of the valve-device with a mechanical operating means in lieu of the electrical operating means of Figure 5, and Figure 8 is an end elevation of the device of Figure 7 as seen when looking from the right of the latter figure.

Figure 9 is a sectional detail view of a ball-governor for the valve-operating means of Figure 7, showing the governor shaft taking power from the speedometer-shaft as in Figure 2.

Figure 3:
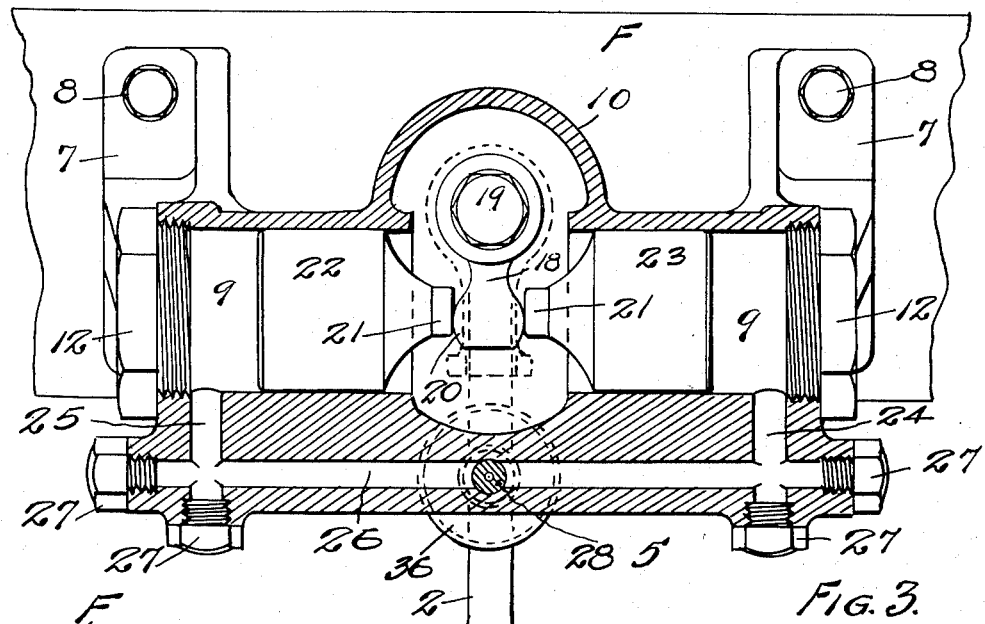
Figure 3 is a longitudinal vertical sectional view of the hydraulic-controller and valve, showing also a portion of the electro-magnetic means for operating the valve.
Figure 4:
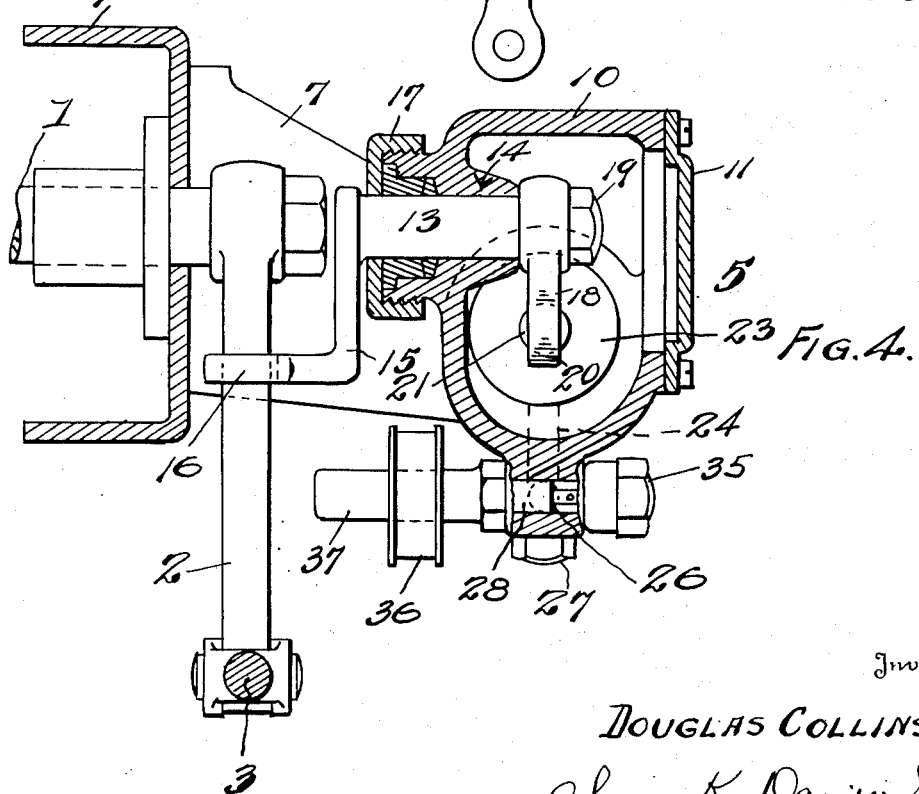
Figure 4 is a transverse vertical section of the hydraulic-controller, showing its relation to the steering-arm or sector-arm of the usual steering mechanism, and also showing the partially closed valve that renders active the controller.

In the assembly view of Figure 1 I have shown a conventional steering wheel W, and steering column C which includes the steering shaft that terminates in the gear housing H. The usual steering worm and sector are enclosed within the housing, and the sector-shaft 1 is journaled in suitable manner, as in the member F forming part of the frame of the car. The steering-arm 2 depends from and oscillates with the sector shaft, and the usual connecting rod or bar 3 extends to the connection 4 of the front wheels of the car.

The hydraulic controller for the sector shaft and steering arm 2 is indicated as a whole by the numeral 5 and the governor and circuit-maker for the valve-device of the controller 5 is indicated as a whole by the numeral 6. The combined governor and circuit-maker 6 is operated from the propeller shaft P of the car through the speedometer shaft enclosed in the tubing T and extending to the speedometer S. The battery B, as employed in the usual electrical system of the car, is connected by wiring to the circuit-maker 6 and the latter is grounded on the frame F. The electro-magnetic valve-operating means indicated at 36 is also connected by wiring to the battery, and also grounded on the frame member F.

These parts, as briefly described, control the swinging movement of the steering-arm 2, by imposing against the arm a load-resistance that becomes automatically effective when the R. P. M. of the propeller shaft attains a predetermined rate of speed and the car likewise attains a predetermined traveling speed, or high-speed. The parts may readily be adjusted for effectiveness at a desired speed that is predetermined; the auxiliary control is not effective below the predetermined high-speed; and the steering mechanism is operable at all speeds of the car.

In installing the auxiliary mechanism of my invention, the hydraulic-controller 5 in the nature of a double-acting dash-pot may be mounted by bracket 7 and bolts 8 upon a suitable support, as the frame F, and the controller embodies a cylinder 9 with a central hood 10 and an interior reservoir at the approximate longitudinal center of the cylinder, which is closed by a front plate 11. The two opposite open ends of the cylinder are threaded for the reception of screw plugs 12 that form closed heads for the cylinder.

Within the hood 10 is mounted an auxiliary rock-shaft 13 extending transversely of the cylinder and journaled in bearings 14, and an integral angular arm 15 on the shaft exterior of the controller is fashioned with a fork 16 that straddles the steering arm 2. The shaft 13, which is packed and secured by nut 17, is axially alined with the sector shaft 1, and the rock-arm 15 of the rock-shaft 13 depends from the rock-shaft so that this forked arm partakes at all times of the oscillating or steering movement of the steering arm 2, under any and all conditions.

Within the central portion of the cylinder of the controller a second actuating arm 18 is bolted at 19 on the end of the rock-shaft 13, and at its lower end this actuating arm is fashioned with a somewhat spherical head 20 that is disposed between two opposed heads 21, 21, of a pair of opposed pistons or plungers 22 and 23 respectively. These pistons or plungers are adapted to reciprocate longitudinally of the hydraulic cylinder 9, and the opposite ends of the cylinder form dash pots for the pistons or plungers. When the steering wheel W is turned to swing the steering arm 2, the actuating arm 18 swings with the steering arm, and the head 20 in contact with the two plunger heads 21, 21, pushes one of the plungers into its dash-pot, and as a consequence the other plunger follows the movement of the first mentioned plunger. This movement takes place with each swing of the steering arm 2, and the oil contained in the contacting dash-pot is forced therefrom into the other expanding dash-pot, through the ports 24 and 25, and a connecting by-passage 26, the latter extending parallel with the cylinder and communicating therewith through the ports.

The outer ends of the ducts or ports and the ends of the by-passage are closed by screw plugs 27. Under ordinary steering conditions, without the benefit of the auxiliary control mechanism, the oil pressure in the two dash-pots is equalized, and therefore the steering wheel W and the steering arm 2 may be turned, as usual, without any perceptible resistance from the plungers of the controller. To build up an operative hydraulic resistance, at high car-speed, to the transfer of oil from one dash-pot to another dash-pot and thereby control the rate of speed in the movement of the steering arm 2 and turning of the steering wheel W, I provide a valve-device including in its construction a solid cylindrical or piston valve 28, which is adapted to partially close a transverse port 29 that intercepts the by-passage 26, and this valve is adapted to reciprocate in a valve chamber 30 that extends transversely of the cylinder and includes the port 29.

As best seen in Figure 5 the slide valve is fashioned with a reduced neck portion 31 and an end-head 32 thereby forming an annular space within the valve chamber 30 which is at all times open to the by-passage regardless of the position of the valve. In Figure 5 the valve has partially closed the port 29 of the by-passage, thereby restricting passage of oil under pressure through the by-passage from the dash-pots. This partially closed, or restricting position of the valve may be adjusted by means of a set bolt 33 threaded through an end wall of the chamber 30 and in the path of the head 32 of the valve. A lock nut 34 retains the adjusting bolt in position, and a screw cap 35 is used to protect these adjusting parts.

In Figure 5, the valve has been moved to its partially closed or restrictive position through the energization of an electro-magnet of which the coil 36 is mounted upon a closed cylindrical housing 37 that is threaded on a tubular boss projecting from the controller. This housing, which forms an enclosure for a portion of the valve also encloses the core 38 of the magnet, and the core is fixed in suitable manner on the end of the valve. A spring 39 coiled about the valve and interposed between the core and the attaching boss, returns the valve to wide-open position when the electro-magnet is de-energized, and holds the valve in this position while the electro-magnet is de-energized, and the auxiliary control mechanism is out of use.

To provide an equalized oil pressure within the cylindrical housing 37, the valve is fashioned with a longitudinally extending oil-duct 40 having end ports opening into the chamber 30 and the closed end of the housing.

This valve-operating electro-magnet may be included within the usual electrical system of the car, and the battery B is utilized to supply the electric current as indicated in Fig. 1.

The combined governor and circuit-maker 6 controls the operating circuit of the electro-magnet, and this circuit-maker is operated centrifugally, to close, at a predetermined speed of the propeller shaft P, through a portion of the speedometer shaft 41 (Fig. 2) which latter shaft is connected in usual and suitable manner to the propeller shaft P. The portion 41 of the speedometer shaft is journaled in and passes through a gear casing 42 mounted at the lower end of the circuit-maker 6, and a worm gear 43 of the speedometer shaft meshes with a complementary gear 44 within the casing and mounted on the upright shaft 45 that is journaled in the stem 46 of the circuit-maker.

The upper end of the shaft 45 projects into a cylindrical cup or casing 47 that is closed by a cover plate 48 of insulating material, and screws, and this cup or casing contains a stationary conductor ring 49 insulated from the casing by a ring 50. One terminal of the circuit-maker includes a clip 51 and screw 52, the former supported by the latter in the insulated cover plate and bearing on the conductor ring, and this terminal is connected with the battery B. As indicated in Figure 6 the shaft 45 is electrically grounded to the interior face of the casing 47, and another terminal 53 on the cover plate at the casing is connected to the casing and also connected by wire to the frame plate F on which it is grounded, and as before explained another wire coming from the coil of the electro-magnet is grounded on the frame F, to complete the circuit.

The conductor ring 49 forms the stationary member of the circuit maker, and a roller 54, shown in rolling contact with the inner periphery of the ring in Figures 2 and 6, forms the movable member of the circuit-maker or switch. The roller is thrown into frictional contact with the conductor ring, and there held, by centrifugal force of the shaft 45, and it is journaled in a double frame 55 that is hinged or pivoted at 56 to a rotary arm 57 mounted upon the upper end of the shaft 45 in the casing or cup 47, and a spring 58 at the hinge 56, having its respective ends hinged to the frame and rotary arm, tends to swing the frame and roller inwardly, away from the conductor ring as indicated by dotted lines in Figure 6. When the centrifugal force of the double-arm 57 is insufficient to overcome the tension of the spring, as at low speeds of the propeller shaft, the spring holds the roller out of contact with the conductor ring, and the circuit maker is open. When the propeller shaft P and the speedometer shaft 41 attain a predetermined speed of rotation, the rotary arm attains the required centrifugal force to swing the roller into contact with the conductor ring and close the circuit, and as long as this predetermined speed, or a greater speed, of the propeller shaft is maintained, the circuit maker remains closed. The electro-magnet is thus energized, the valve is partially closed to restrict hydraulic movement, and the controller is effective to impose a yielding load-resistance against an excess rate of speed in the movement of the steering arm 2.

In the modified form of the valve device and its operating means of Figures 7, 8, and 9, I utilize centrifugal force in connection with a mechanical valve-operating device, but I dispense with the electro-magnetic operation of the valve.

In this modification of the invention for operating the valve 28' of Figure 7, the mechanical control device is in the nature of a centrifugal ball-governor, operated through the worm gears 43 and 44 in the gear casing 42 (Fig. 9), from the speedometer shaft, and this gear casing is attached at the lower end of a base 59 of the governor casing 60. The governor shaft 61, on which is mounted the worm gear 44 extends up into the casing 60 and a conventional type of ball-governor 62 is mounted on the shaft, with a slide collar 63, to which one end 64 of a pull wire 65 is attached. The pull-wire is of suitable length and is preferably encased in a flexible tubing 66 for protection. The other end of the pull-wire is connected to a radial cam-arm 67, bolted at 68 on the outer end of the valve stem 28', which stem is both longitudinally movable and oscillatable in its packed bearing chamber which intercepts the by-passage 26 of the controller.

The stem 28' is fashioned with a neck 31 and a valve head 69 the latter being designed to move from open position of Figure 7 to partially close the port 29 and restrict transfer of oil through the by-passage between the two dash-pots 9, 9. For imparting the longitudinal reciprocating movement and the oscillating movement to the valve stem and valve, I utilize a semi-circular plate 70 having a circumferentially extending cam-slot 71, and this plate is mounted on a bracket arm 72 bolted at 73 to the controller. The bolt passes through a slot 74 so that the cam plate may be adjusted to fix the position of the valve head with relation to the intercepting port. The valve chamber is vented at 75 into the reservoir between the two dash-pots to insure freedom of movement of the valve 69.

The radial arm 67 to which the pull-wire 65 is fastened projects through the cam slot 71 and frictionally engages the walls of the slot, so that when the governor, by centrifugal force pulls on the wire 65, the arm swings through the cam slot from full line position to dotted line position in Fig. 8. This swinging movement of the arm in the cam slot swings the valve stem, or rotates it through the quadrant of a circle, and at the same time pulls the valve and stem, longitudinally, to the right in Figure 7, to partially close the port 29 and thereby restrict transfer of oil from one dash-pot to the other dash-pot.

The controller is thus made effective as previously described to impose the load resistance on the swinging motion of the steering arm 2.

When the speed of the car and the propeller shaft is reduced below that which will operate the centrifugal governor as required, the governor, by gravity action, resumes normal position thereby pushing the wire 65 to swing the radial arm 67 and through the action of the cam-slot the valve 69 is returned to wide-open position.

Having thus fully described my invention, what I claim as new and desire to secure by Letters Patent is:

1. An auxiliary means for decreasing the flexibility of a steering mechanism and comprising a fluid-pressure controller co-acting with the steering mechanism, a valve device for varying the rate of flow of fluid within the controller, an electro-magnet and its circuit for operating the valve device, a circuit-maker in said circuit, a governor for closing the circuit-maker, and power operated propelling means to actuate the governor at a predetermined rate of speed.

2. An auxiliary means for decreasing the flexibility of a steering mechanism for an automotive vehicle and comprising a hydraulic controller co-acting with the steering mechanism, a valve-device for varying the rate of flow of fluid within the controller, an electro-magnet and its control circuit and a circuit-maker for said magnet whereby the latter operates said valve device, a governor for the circuit-maker, and operative connections between the governor and the propeller shaft of the vehicle whereby the governor closes the circuit-maker at a predetermined speed of the propeller shaft.

3. In an auxiliary mechanism for imposing a yielding load resistance to the steering mechanism of an automotive vehicle, the combination of a hydraulic controller constantly connected with the steering mechanism but ineffective at normal low speeds of the vehicle, and activated only at a predetermined high speed of the vehicle and comprising a pair of opposed dash-pots, a valve device for varying the rate of flow of fluid between said dash-pots, operating means for the valve device, means operating in accord with a predetermined speed of the vehicle for governing said operating means, and means co-acting with an operating part of the steering mechanism for actuating the dash-pots.

4. In an auxiliary mechanism for use with a vehicle for imposing a yielding resistance against excessive speed in the rate of movement of an operating part of the vehicle steering mechanism, the combination with a controller constantly connected with the steering mechanism, ineffective at normal speeds and adapted to become effective only at predetermined high speed of the vehicle for co-action with said part, a valve device for controlling operation of the controller, and means governed by a predetermined speed of a power operated mechanism for activating the valve device.

5. In auxiliary means for use with a vehicle to impose a yielding resistance against excessive rate of movement of an operating part of the steering mechanism, the combination with a hydraulic controller, constantly connected with the steering mechanism, ineffective at normal speeds and adapted to become effective only at a predetermined high speed of the vehicle for co-action with said part, a valve device for varying the rate of flow of fluid within the controller, and means governed by a predetermined high speed of a power-operated mechanism for controlling the valve-device.

6. The combination with a steering mechanism and power-operated propelling means for a vehicle, of an auxiliary mechanism constantly connected with the steering mechanism for automatically imposing a yielding resistance against excessive rate of movement of the steering mechanism and comprising a hydraulic controller ineffective at normal low speeds and effective in conjunction with the steering mechanism only at a predetermined high speed of the vehicle, a valve device for varying the rate of flow of fluid within the controller, operating means for the valve device, and means actuated by the propelling means for governing the operating means.

7. An auxiliary means for decreasing the flexibility of a steering mechanism for a vehicle and comprising a fluid pressure controller constantly connected with the steering mechanism, said controller being ineffective at normal speeds of the vehicle and adapted to become effective at a predetermined high speed, a valve device for varying the rate of flow of fluid within the controller, operating means for said valve device, a governor for controlling said operating means, and power-operated propelling means adapted to actuate the governor.

8. In an auxiliary mechanism for imparting a load-resistance to the steering mechanism of a vehicle, the combination with a controller constantly connected with the steering mechanism, said controller being ineffective at normal speeds and effective at predetermined high speed of the vehicle, said controller also comprising a pair of opposed dash-pots, means for varying the rate of flow of fluid between said dash-pots in accord with a predetermined high speed of the vehicle, an element of the controller co-acting with the steering mechanism, and a member of the controller rigid with said element and co-acting with the the dash-pots.

DOUGLAS COLLINS.